US012688966B2

(12) United States Patent
Som et al.

(10) Patent No.: US 12,688,966 B2
(45) Date of Patent: Jul. 21, 2026

(54) COIL MODULE AND METHOD FOR PRODUCING A COIL ASSEMBLY

(71) Applicant: WÜRTH ELEKTRONIK EISOS GMBH & CO. KG, Waldenburg (DE)

(72) Inventors: Cem Som, Zorneding (DE); Klaus Richter, Abstatt (DE)

(73) Assignee: WÜRTH ELEKTRONIK EISOS GMBH & CO. KG, Waldenburg (DE)

( * ) Notice: Subject to any disclaimer, the term of this patent is extended or adjusted under 35 U.S.C. 154(b) by 843 days.

(21) Appl. No.: 17/792,303

(22) PCT Filed: Feb. 4, 2021

(86) PCT No.: PCT/EP2021/052650
§ 371 (c)(1),
(2) Date: Jul. 12, 2022

(87) PCT Pub. No.: WO2021/160508
PCT Pub. Date: Aug. 19, 2021

(65) Prior Publication Data

US 2023/0059428 A1 Feb. 23, 2023

(30) Foreign Application Priority Data

Feb. 12, 2020 (DE) ..................... 10 2020 201 753.0

(51) Int. Cl.
*H01F 27/08* (2006.01)
*H01F 27/26* (2006.01)
(Continued)

(52) U.S. Cl.
CPC ......... *H01F 27/306* (2013.01); *H01F 27/266* (2013.01); *H01F 38/14* (2013.01); *H01F 41/04* (2013.01)

(58) Field of Classification Search
CPC ...... H01F 27/306; H01F 27/266; H01F 38/14; H01F 41/04; H01F 27/263; H01F 27/366;
(Continued)

(56) References Cited

U.S. PATENT DOCUMENTS 7,586,231 B2 * 9/2009 Wang ..................... H02K 3/522
310/260
9,837,204 B2 12/2017 Widmer et al.
(Continued)

FOREIGN PATENT DOCUMENTS

CN 107833729 3/2018
CN 109193858 1/2019
(Continued)

OTHER PUBLICATIONS

International Search Report issued in International Application No. PCT/EP2021/052650, May 4, 2021, 5 pages w/translation.
(Continued)

*Primary Examiner* — Shawki S Ismail
*Assistant Examiner* — Kazi S Hossain
(74) *Attorney, Agent, or Firm* — HSML P.C.

(57) ABSTRACT

A coil module comprises a carrier which has a polygonal basic shape with four to twelve corners and comprises a magnetic material. A coil is arranged on the carrier. The polygonal basic shape is rotationally symmetrical with an angle of 360°·2 divided by the number of corners. To produce a coil assembly, a plurality of coil modules can be connected to each other. This makes it possible to produce an efficient coil assembly for wireless electromagnetic energy transmission in a simple and flexible manner.

13 Claims, 4 Drawing Sheets

(51) Int. Cl.
*H01F 27/30* (2006.01)
*H01F 38/14* (2006.01)
*H01F 41/04* (2006.01)

(58) Field of Classification Search
CPC . H01F 5/00; H01F 27/30; Y02T 10/70; Y02T 10/7072; Y02T 90/14; H02J 50/005
USPC ........................................... 336/221, 83, 182
See application file for complete search history.

(56) References Cited

U.S. PATENT DOCUMENTS

| | | | | |
|---|---|---|---|---|
| 2008/0129246 | A1* | 6/2008 | Morita | B60M 7/00 320/108 |
| 2013/0069444 | A1 | 3/2013 | Waffenschmidt et al. | |
| 2015/0280442 | A1* | 10/2015 | Graham | H02J 50/402 307/31 |
| 2016/0218534 | A1* | 7/2016 | Islinger | H02J 7/70 |
| 2019/0304678 | A1* | 10/2019 | Murashige | H04B 5/26 |

FOREIGN PATENT DOCUMENTS

| | | |
|---|---|---|
| JP | 2008-120239 | 5/2008 |
| JP | 2013-115200 | 6/2013 |
| JP | 2013-118793 | 6/2013 |
| JP | 2013-214613 | 10/2013 |
| JP | 2016-001983 | 1/2016 |
| JP | 2016-076645 | 5/2016 |
| KR | 10-2017-0115560 | 10/2017 |
| WO | 2016/124526 | 8/2016 |

OTHER PUBLICATIONS

Written Opinion issued in International Application No. PCT/EP2021/052650, May 4, 2021, 7 pages.
Examination Report issued in German Patent Application No. 10 2020 201 753.0, Dec. 12, 2020, 6 pages.
Korean Office Action issued in KR Application No. 10-2022-7027845, dated Sep. 11, 2024, 13 pages, English translation provided.
Japanese Office Action issued in JP Application No. 2022-547968, dated Nov. 26, 2024, 6 pages, English translation provided.

* cited by examiner

COIL MODULE AND METHOD FOR PRODUCING A COIL ASSEMBLY

CROSS-REFERENCES TO RELATED APPLICATIONS

This application claims the priority of German Patent Application, Serial No. DE 10 2020 201 753.0, filed Feb. 12, 2020, the content of which is incorporated herein by reference in its entirety as if fully set forth herein.

FIELD OF THE INVENTION

The invention relates to a coil module for producing a coil assembly and to a coil assembly having at least two such coil modules. Furthermore, the invention relates to a method for producing a coil assembly.

BACKGROUND OF THE INVENTION

An apparatus for wireless electromagnetic transmission of energy is known from U.S. Pat. No. 9,837,204 B2. The apparatus, for example, serves to charge electric vehicles. The apparatus comprises a stationary base charging system and a vehicle charging system arranged in the electric vehicle. The base charging system comprises, for example, two coils which are arranged side by side on a ferrite plate and interconnected.

A wireless charging apparatus is known from CN 109 193 858 A. The charging apparatus comprises a magnetic core and coils arranged thereon. The magnetic core comprises bars arranged in a triangular or star shape.

SUMMARY OF THE INVENTION

It is an object of the invention to provide a coil module which enables the production of an efficient coil assembly for wireless electromagnetic energy transmission in a simple and flexible manner.

This object is achieved by a coil module for the production of a coil assembly having a carrier, which has a polygonal basic shape having a number N of corners, wherein: $4 \le N \le 12$, and which comprises a magnetic material, a coil arranged on the carrier, wherein the polygonal basic shape is rotationally symmetrical with an angle of $360° \cdot 2/N$. Due to the polygonal basic shape of the carrier, the coil module according to the invention enables the production of a coil assembly of a plurality of coil modules in a simple and flexible manner. Due to the polygonal basic shape, the carriers of the coil modules can be arranged next to each other and/or fastened to each other in a simple and flexible manner. Preferably, the following applies: $6 \le N \le 10$, in particular N=8. The carrier-geometrically speaking-must essentially have the basic polygonal shape. However, the carrier may have rounded corners and/or edges, for example due to production, so that the carrier may deviate slightly from a polygonal shape. Owing to the rotational symmetry, the coil modules can be arranged next to each other in a simple and flexible manner to produce a coil assembly.

The coil is arranged on the carrier to generate an electromagnetic field. Preferably, the coil module comprises exactly one coil. The coil is preferably arranged within the polygonal basic shape. In other words, the windings of the coil do not extend laterally beyond the carrier. To produce a coil assembly, the coils of the coil modules can be easily and flexibly connected in series and/or in parallel. The electrical properties of the coil assembly can thus be easily and flexibly adapted in a desired manner. Due to the fact that the carrier comprises a magnetic material, the electromagnetic field can be guided and/or shielded in a simple and flexible manner. Preferably, the magnetic material is a ferrite material. In particular, the ferrite material comprises manganese and zinc. Preferably, the carrier is made of the magnetic material.

The coil module according to the invention allows in a simple way the production of coil assemblies having a largely random shape. Due to the shape and/or the interconnection of the coil modules, the respective coil assembly can be flexibly adapted to the desired application, so that a high efficiency in wireless electromagnetic energy transmission can be achieved.

A coil module in which the number N of corners is even ensures a simple and flexible production of an efficient coil assembly. Preferably, the number N is selected from the set of numbers 4, 6, 8, 10 and 12. Preferably, the basic shape is an octagon or an octagon with N=8.

A coil module in which the polygonal basic shape is rotationally symmetrical with an angle of 360°/N ensures a simple and flexible production of an efficient coil assembly. Preferably, the basic shape is regular. A regular basic shape means that the polygon is equilateral and equiangular. Preferably, the basic shape is a regular square, a regular hexagon, a regular octagon, a regular decagon or a regular dodecagon.

A coil module in which the carrier is plate-shaped ensures a simple and flexible production of an efficient coil assembly. The carrier is preferably planar in shape. The carrier comprises an upper side, an underside and side regions formed therebetween. The number of side regions corresponds to the number N. For a thickness D of the carrier, the following preferably applies: 1 mm≤D≤12 mm, in particular 2 mm≤D≤10 mm, and in particular 3 mm≤D≤9 mm. For a maximum dimension A of the carrier parallel to the upper side and/or underside, the following preferably applies: 15 mm≤A≤200 mm, in particular 25 mm≤A≤150 mm, and in particular 35 mm≤A≤100 mm.

A coil module in which the carrier comprises side regions which are straight and/or flat at least in sections ensures a simple and flexible production of an efficient coil assembly. The carrier preferably comprises an upper side and an underside, between which the side regions are arranged. The number of side regions corresponds to the number N. Due to the formation of the side regions, the carriers of coil modules can be arranged directly next to one another for producing a coil assembly. In particular, the bars can be arranged edge to edge.

A coil module in which the carrier comprises side regions, wherein a respective fastening element is arranged in at least two of the side regions, ensures a simple and flexible production of an efficient coil assembly. Due to the fact that at least two of the side regions have a respective fastening element, the carrier can be connected to further carriers of adjacent coil modules. Preferably, the fastening elements serve for form-fit and/or frictional-locking and/or materially bonded connection. Preferably, the carrier has at least one first fastening element and at least one second fastening element which are formed differently from one another. Preferably, the respective second fastening element is shaped negatively relative to the respective first fastening element. This allows a first fastening element of a carrier to be connected to a second fastening element of a further carrier and vice versa. This enables simple and flexible connection of the coil modules to form a coil assembly.

A coil module in which the carrier comprises side regions, wherein at least two different fastening elements are arranged in the side regions, ensures a simple and flexible production of an efficient coil assembly. The carrier comprises at least one first fastening element and at least one second fastening element, which are formed differently. The fastening elements serve for form-fit and/or friction-locking and/or materially bonded connection to a fastening element of a further carrier. The second fastening element is preferably negatively shaped relative to the first fastening element. This enables a form-fit and/or frictional-locking and/or materially bonded connection of a first fastening element of a first carrier to a second fastening element of a second carrier and vice versa. Preferably, first and second fastening elements are arranged alternately in the side regions in a circumferential direction. The fastening elements allow a simple and flexible connection of the coil modules for the construction of a coil assembly.

A coil module in which the coil comprises at least two windings which are arranged in one plane ensures a simple and flexible production of an efficient coil assembly. Preferably, the coil is wound in a spiral or helical shape. In particular, spiral means that a distance from a winding axis at the outer end of a winding is greater than a distance from the winding axis at the inner beginning of the winding. Preferably, all windings of the coil lie in one plane. Preferably, the coil is arranged on an upper side of the carrier. Preferably, at least one winding, in particular each winding, forms a number n of straight winding portions, wherein n=N. For example, if the carrier is formed as an octagon, a respective winding of the coil is preferably octagonal and spirally wound. Preferably, the straight winding portions are arranged parallel to the rectilinear and/or planar side regions or to the sides of the polygonal basic shape.

A coil module in which the coil comprises at least one winding which forms a number n of straight winding portions, wherein: n=N, ensures a simple and flexible production of an efficient coil assembly. Due to the design of the at least one winding, preferably each winding, the surface area provided by the carrier for arranging the coil is optimally utilized. The straight winding portions of the respective winding are arranged, in particular, parallel to the rectilinear and/or planar side regions of the carrier or to the sides of the polygonal basic shape. The coil is preferably polygonal and spirally wound.

A coil module in which at least one spacer element, which in particular comprises a magnetic material, is arranged between two adjacent windings of the coil ensures a simple and flexible production of an efficient coil assembly. The at least one spacer element enables a mechanically and/or electrically separated or insulating assembly of adjacent windings of the coil. Preferably, the at least one spacer element comprises a magnetic material, in particular a ferrite material. For example, the at least one spacer element is made of a ferrite material. In particular, the at least one spacer element reduces the proximity effect, thereby making better use of the conductor cross-section of the coil and improving a coupling in the wireless electromagnetic energy transmission. The at least one spacer element is formed, for example, as a ferrite foil. The ferrite foil preferably has a thickness between 50 μm and 200 μm. A height of the at least one spacer element substantially corresponds to a height of the coil. Preferably, the at least one spacer element is formed in one piece with the carrier and/or is part of the carrier.

It is further an object of the invention to provide a coil assembly that provides efficient wireless electromagnetic power transmission in a simple and flexible manner for various applications.

This object is achieved by a coil assembly for wireless electromagnetic energy transmission having at least two coil modules according to the invention. Preferably, the coil assembly has a number K of coil modules, wherein: $2 \leq K \leq 100$, in particular $6 \leq K \leq 80$, and in particular $10 \leq K \leq 60$. Preferably, in the case of adjacent coil modules, the carriers are mechanically connected to one another and/or the coils are electrically connected to one another. Preferably, the coils of a plurality of coil modules are connected in series and/or in parallel. The coil assembly is constructed, for example, in the form of a figure of eight of coil modules.

The invention is further based on the object of providing a method that enables the production of an efficient coil assembly for wireless electromagnetic energy transmission in a simple and flexible manner.

This object is achieved by a method for producing a coil assembly, comprising the steps of providing at least two coil modules according to the invention, and electrically connecting the coils and/or mechanically connecting the carriers of the at least two coil modules. The advantages of the method according to the invention correspond to the advantages of the coil module according to the invention and the coil assembly according to the invention already described.

Further features, advantages and details will be apparent from the following description of several embodiments.

DESCRIPTION OF THE PREFERRED EMBODIMENTS

Figure 1:
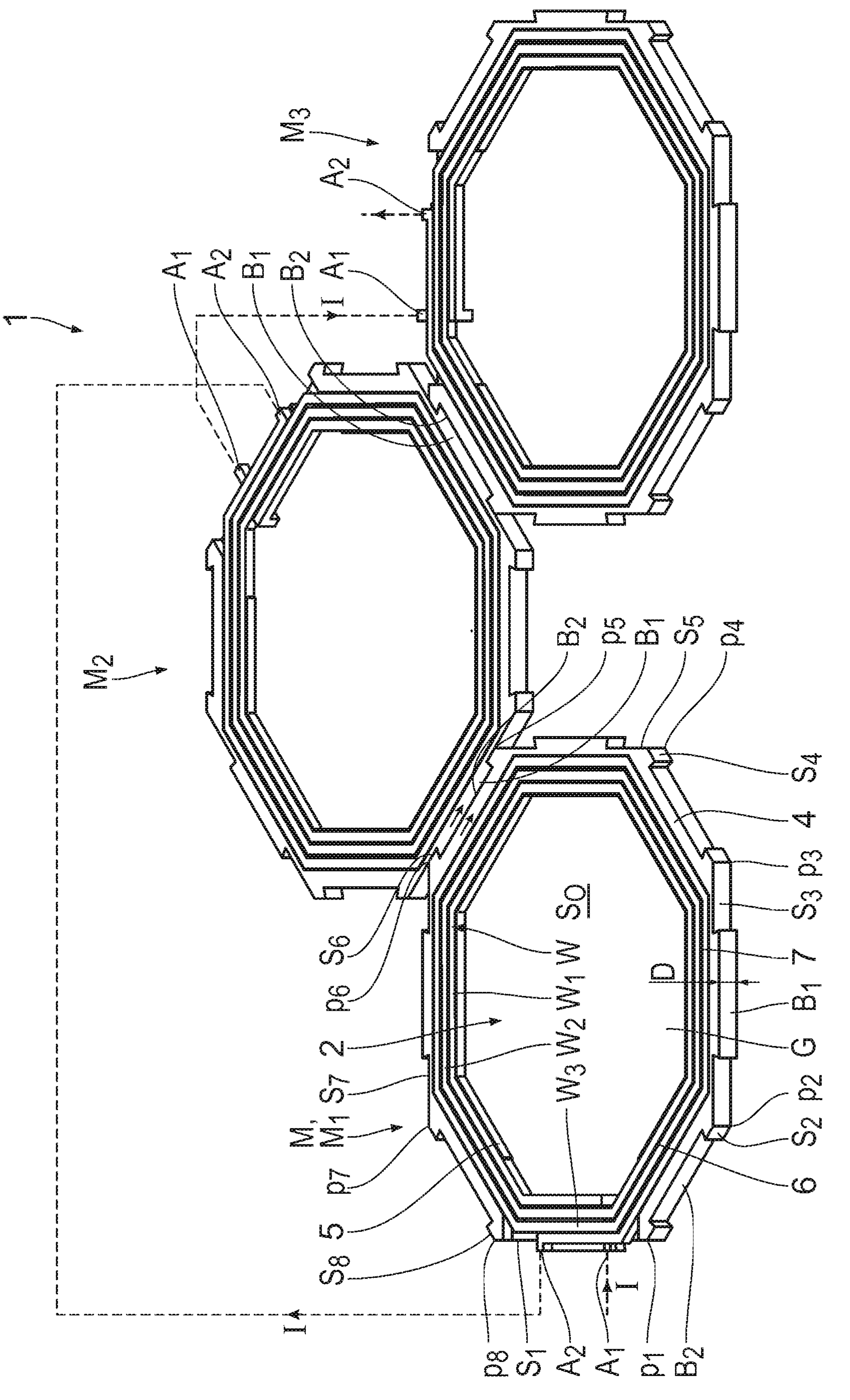
FIG. 1 shows a perspective view of a coil assembly which is constructed from a plurality of coil modules according to a first embodiment.
Figure 2:
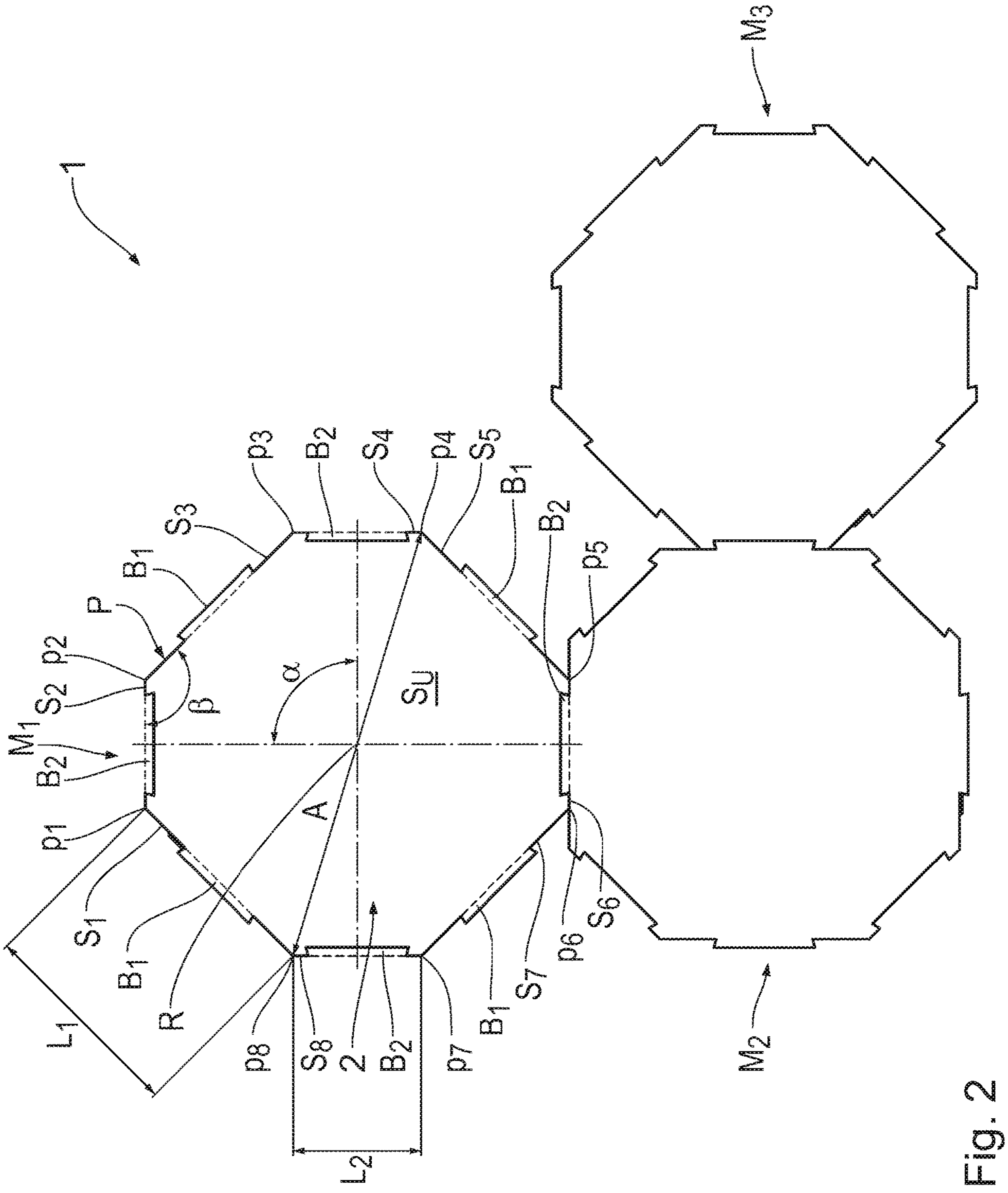
FIG. 2 shows a top view onto an underside of the coil assembly in FIG. 1.

A first embodiment of the invention is described below with reference to FIGS. 1 and 2. A coil assembly 1 comprises a plurality of coil modules M, which are designated individually as $M_1$, $M_2$ and $M_3$ in FIG. 1. The coil modules $M_1$, $M_2$ and $M_3$ are identically formed. Insofar as a distinction between the coil modules $M_1$, $M_2$ and $M_3$ is not important in the following, they are generally referred to as coil module M. Insofar as a distinction is important below, the coil modules are designated as $M_1$, $M_2$ and $M_3$.

One of the coil modules M is described in detail below. The coil module M comprises a carrier 2 on which a coil 3 is arranged. The carrier 2 has a polygonal basic shape P with a number of N corners. The corners are designated individually by $p_1$ to $p_N$. In the present embodiment, N=8. The polygonal basic shape P is thus an octagon.

The polygonal basic shape P has an axis R. The polygonal basic shape P is rotationally symmetrical about the axis R with an angle $\alpha = 360° \cdot 2/N = 90°$. The polygonal basic shape P has equal interior angles β. The polygonal basic shape P has first sides with a first side length $L_1$ and second sides with a side length $L_2$. The first side length $L_1$ is greater than the second side length $L_2$. The sides with the different side lengths $L_1$ and $L_2$ are arranged alternately in one direction about the axis R.

The carrier 2 is configured to be plate-shaped. The carrier 2 comprises a base plate G with an upper side $S_O$, an underside $S_U$ and side regions $S_1$ to SN arranged in between. In the present embodiment, the carrier 2 has eight side regions $S_1$ to $S_8$. The side regions $S_1$ to $S_8$ are configured to be rectilinear and planar. The carrier 2 comprises first fastening elements $B_1$ and second fastening elements $B_2$ in the side regions $S_1$ to $S_8$. The first fastening elements $B_1$ are arranged in the side regions $S_1$, $S_3$, $S_5$ and $S_7$, whereas the second fastening elements $B_2$ are arranged in the side regions $S_2$, $S_4$, $S_6$ and $S_8$. The fastening elements $B_1$ and $B_2$ are formed differently. The fastening elements $B_1$ are formed as a dovetail-shaped projection, whereas the second fastening elements $B_2$ are formed as a dovetail-shaped recess. The second fastening elements $B_2$ are shaped negatively to the first fastening elements $B_1$. The fastening elements $B_1$ and $B_2$ are formed in one piece with a base plate G of the carrier 2. The fastening elements $B_1$ and $B_2$ are oriented in such a way that a connection is made by a movement parallel to the axis R.

The carrier 2 is made of a magnetic material, preferably a ferrite material. The ferrite material comprises in particular manganese and zinc. The carrier 2 has a thickness D in the direction of the axis R. The following applies to the thickness D: 1 mm≤D≤12 mm. The carrier 2 has a maximum dimension A transverse to the axis R. For the maximum dimension A, the following applies 15 mm≤A≤200 mm.

The carrier 2 comprises an outer frame 4, which is arranged on the upper side $S_O$. The frame 4 is formed in one piece with the base plate G. The outer frame 4 is thus formed of a magnetic material, for example a ferrite material. The frame 4 is formed according to the polygonal basic shape P and is formed to be open in the side region $S_1$.

The coil 3 is arranged inside the outer frame 4. The coil 3 is wound spirally about the axis R. The coil 3 essentially has three windings, which are designated individually as $W_1$, $W_2$ and $W_3$. The windings $W_1$ to $W_3$ are arranged in one common plane. The cross section of the coil 3 is preferably between 1 $mm^2$ and 10 $mm^2$.

Each of the windings $W_1$ to $W_3$ is polygonally wound so that each of the windings $W_1$ to $W_3$ forms a number n of straight winding portions w. The following applies: n=N. This means that the windings $W_1$ to $W_3$ have a polygonal shape which corresponds to the polygonal basic shape P. The winding portions w run parallel to the side regions $S_1$ to $S_8$ or parallel to the sides of the polygonal basic shape P. The coil 3 comprises an inner terminal $A_1$ and an outer terminal $A_2$. The inner terminal $A_1$ is connected to the winding $W_1$ and led to the outside below the windings $W_2$, $W_3$ and the outer terminal $A_2$. The outer terminal $A_2$ is connected to the winding $W_3$. Terminals $A_1$ and $A_2$ are located in the side region $S_1$.

The carrier 2 further comprises an inner frame 5 which is arranged on a side of the coil 3 facing the axis R. The inner frame 5 is formed in one piece with the base plate G. Thus, the inner frame 5 is formed of a magnetic material, for example a ferrite material. The inner frame 5 has a polygonal shape which corresponds to the basic polygonal shape P. The sides of the inner frame 5 run parallel to the sides of the outer frame 4. The inner frame 5 is formed to be open towards the side region $S_1$.

One spacer element 6, 7 each is arranged between the windings $W_1$ and $W_2$ and the windings $W_2$ and $W_3$. The spacer elements 6, 7 are formed in one piece with the base plate G and are part of the carrier 2. The spacer elements 6, 7 are thus formed from a magnetic material, for example a ferrite material. The frames 4, 5 are thus formed from a magnetic material, for example a ferrite material. The spacer elements 6, 7 have a polygonal shape corresponding to the windings $W_1$ to $W_3$. The spacer elements 6, 7 are formed to be open towards the side region $S_1$.

To produce the coil assembly 1, the coil modules $M_1$, $M_2$ and $M_3$ are mechanically connected. For this purpose, the coil module $M_2$ is connected to a second fastening element $B_2$ of the coil module $M_1$ by means of a first fastening element $B_1$. Furthermore, the coil module $M_2$ is connected by means of a first fastening element $B_1$ to a second fastening element $B_2$ of the coil module $M_3$. As a result, the coil assembly 1 has an angular shape. Further coil modules M can be connected in a corresponding manner so that the coil assembly 1 can form a desired shape depending on the application, for example the shape of a figure eight.

The coil modules $M_1$, $M_2$ and $M_3$ are further connected electrically to one another. The coils 3 of the coil modules $M_1$, $M_2$ and $M_3$ are connected in series in such a way that a current can flow through the coils 3 of the adjacent coil modules $M_1$ and $M_2$ and of the adjacent coil modules $M_2$ and $M_3$ in the same directions in the respective mechanical connection regions. For this purpose, the terminal $A_2$ of the coil module $M_1$ is connected to the terminal $A_2$ of the coil module $M_2$ and the terminal $A_1$ of the coil module $M_2$ is connected to the terminal $A_1$ of the coil module $M_3$. This is illustrated in FIG. 1 by a dashed line and arrows for the current flow I.

Due to the fact that the coil modules M can be connected in a simple and flexible manner to form a coil assembly 1, the coil assembly 1 has a high efficiency in wireless electromagnetic power transmission. The coil module M can be produced in a simple and automatic manner.

Figure 3:
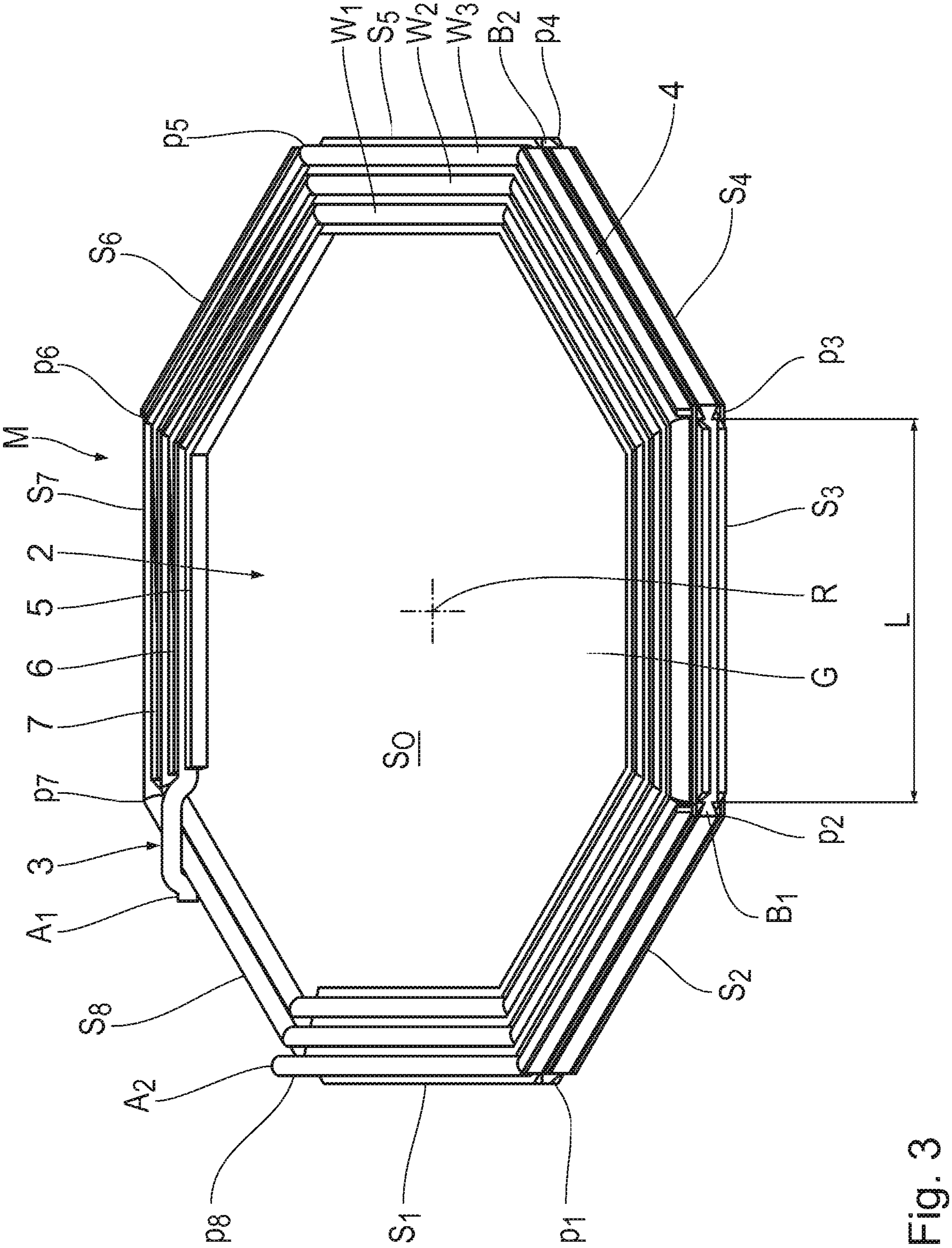
FIG. 3 shows a perspective view of a coil module according to a second embodiment.

A second embodiment of the invention is described below with reference to FIG. 3. In contrast to the first embodiment, the first fastening elements $B_1$ are arranged in the side regions $S_2$, $S_4$, $S_6$ and $S_8$, whereas the second fastening elements $B_2$ are arranged in the side regions $S_1$, $S_3$, $S_5$ and $S_7$. The first fastening elements $B_1$ are formed as dovetail-shaped projections which are arranged on the base body G. In contrast, the second fastening elements $B_2$ are formed as dovetail-shaped recesses. The fastening elements $B_1$ and $B_2$ are oriented in such a way that the mechanical connection of two coil modules M is carried out by a movement parallel to the upper side $S_O$ of the base plate G. The side regions $S_1$ to $S_8$ have an equal length L, so that the polygonal basic shape P is regular. The terminal $A_1$ is led to the outside above the windings $W_2$, $W_3$. With regard to the further construction and the broad mode of operation of the coil module M, reference is made to the preceding embodiment.

Figure 4:
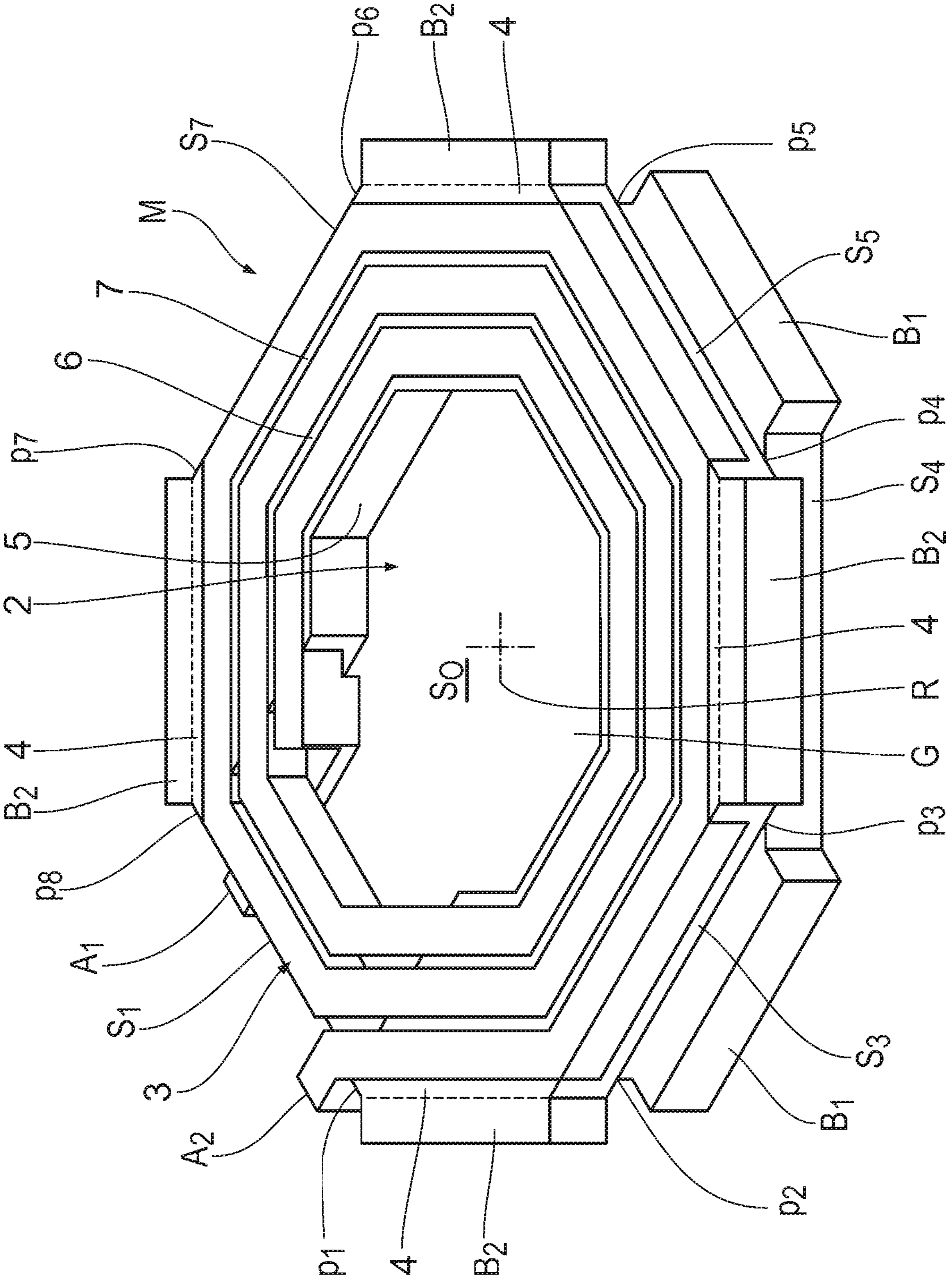
FIG. 4 shows a perspective view of a coil module according to a third embodiment.

A third embodiment of the invention is described below with reference to FIG. 4. In contrast to the preceding embodiments, the first fastening elements $B_1$ are formed as projections arranged at the bottom, whereas the second fastening elements $B_2$ are formed as projections arranged at the top. The first fastening elements $B_1$ are arranged laterally on the base plate G, whereas the second fastening elements $B_2$ are arranged on the upper side $S_O$ of the base plate G and on the outer frame 4 and extend laterally outward. The outer frame 4 is formed to be open or interrupted in the side regions $S_1$, $S_3$, $S_5$ and $S_7$. For mechanical connection, a first fastening element $B_1$ and a second fastening element $B_2$ of adjacent coil modules M are arranged one above the other so that they overlap. In the overlap region, the fastening elements $B_1$ and $B_2$ are connected to each other. The connection can be made, for example, by a material bond by means of an adhesive and/or by a form fit via a profile and a counter-profile. With regard to the further construction and the further mode of operation of the coil module M, reference is made to the preceding embodiments.

The invention claimed is:

1. A coil module for the production of a coil assembly having a carrier, which has a polygonal basic shape having a number N of corners, wherein: 4≤N≤12, and which comprises a magnetic material, a coil arranged on the carrier, wherein the polygonal basic shape is rotationally symmetrical with an angle of 360°·2/N, wherein the carrier comprises side regions, wherein a respective fastening element is arranged in at least two of the side regions, wherein at least two different fastening elements are arranged in the side regions, wherein the at least two different fastening elements include male fastening elements and female fastening elements that are alternately arranged along the side regions of the carrier, wherein the coil module is connected to a second coil module and the second coil module is connected to a third coil module, wherein there is a gap between the coil module and the third coil module.

2. The coil module according to claim 1, wherein the number N of corners is even.

3. The coil module according to claim 1, wherein the polygonal basic shape is rotationally symmetrical with an angle of 360°/N.

4. The coil module according to claim 1, wherein the carrier is plate-shaped.

5. The coil module according to claim 1, wherein the carrier comprises side regions which are at least one of straight and flat at least in sections.

6. The coil module according to claim 1, wherein the carrier comprises side regions, wherein at least two different fastening elements are arranged in the side regions.

7. The coil module according to claim 1, wherein the coil comprises at least two windings which are arranged in one plane.

8. The coil module according to claim 1, wherein the coil comprises at least one winding which forms a number n of straight winding portions, wherein: n=N.

9. The coil module according to claim 1, wherein at least one spacer element is arranged between two adjacent windings of the coil.

10. A coil assembly for wireless electromagnetic energy transmission having at least two coil modules according to claim 1.

11. A method for producing a coil assembly, comprising the steps of:

providing at least two coil modules according to claim 1, and at least one of electrically connecting the coils and mechanically connecting the carriers of the at least two coil modules.

12. The coil module according to claim 9, wherein the at least one spacer element comprises a magnetic material.

13. A coil module for the production of a coil assembly having at least three coil modules, each having a carrier, which has a polygonal basic shape having a number N of corners, wherein: 4≤N≤12, and which comprises a magnetic material, a coil arranged on the carrier, wherein the polygonal basic shape is rotationally symmetrical with an angle of 360°·2/N, wherein the carrier comprises side regions, wherein a respective fastening element is arranged in at least two of the side regions, wherein the coil module is connected to a second coil module and the second coil module is connected to a third coil module, wherein there is a gap between the first coil module and the third coil module.

* * * * *